No. 77,287.

E. HUNTER.
SPECTACLES.

PATENTED APR. 28, 1868.

Witnesses.
Wm. A. Steel.
John Parker.

Inventor
E. Hunter
by his Atty
H. Howson

United States Patent Office.

EDWARD HUNTER, OF PHILADELPHIA, PENNSYLVANIA.

Letters Patent No. 77,287, dated April 28, 1868.

IMPROVEMENT IN SPECTACLES.

The Schedule referred to in these Letters Patent and making part of the same.

TO ALL WHOM IT MAY CONCERN:

Be it known that I, EDWARD HUNTER, of Philadelphia, Pennsylvania, have invented an Improvement in Spectacles; and I do hereby declare the following to be a full, clear, and exact description of the same.

My invention consists of a detachable nose-piece, so fitted and secured to the frames of spectacles that the glasses are rendered adjustable from or towards each other, and adaptable to the use of different wearers.

In order to enable others to make and use my invention, I will now proceed to describe its construction and operation, reference being had to the accompanying drawing, which forms a part of this specification, and in which—

Figure 1:
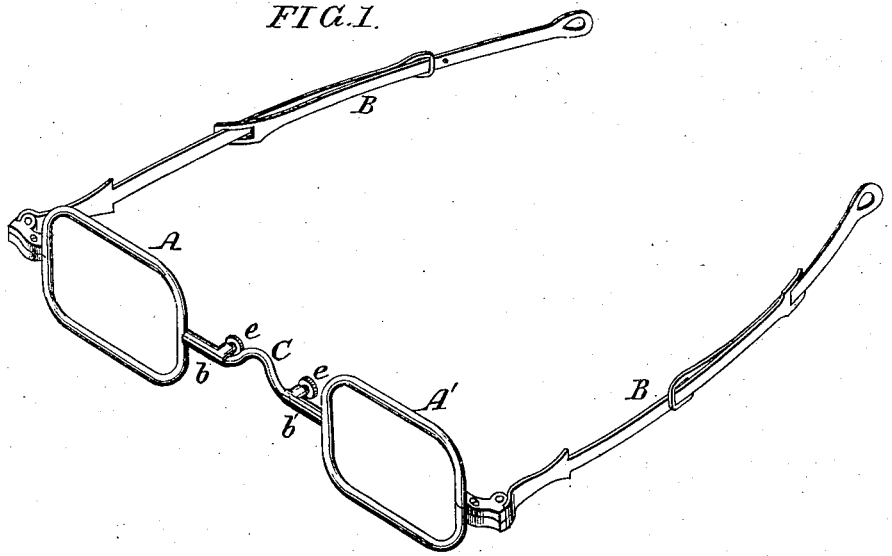
Figure 2:
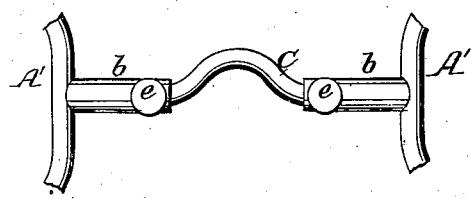
Figure 3:
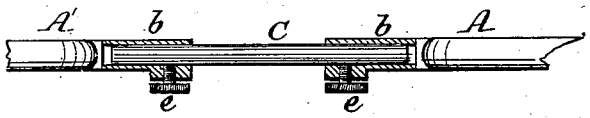

Figure 1 is a front view of my improved spectacles, and
Figures 2 and 3 views of part of the same drawn to an enlarged scale.

A and A' are the usual frames, in which are fitted the glasses of the spectacles, and to these frames are hinged the usual elastic arms B B.

On the inner end of each frame is a tubular projection, $b$, each projection being furnished with a set-screw.

One end of a nose-piece, C, fits snugly in the projection $b$ of one frame, and the other end into the projection of the other frame.

When it is desired to so adjust the spectacles that the frames will be in the most convenient relative position for the eyes of the wearer, the set-screws $e\ e$ are loosened, and the frames drawn apart or moved towards each other to the desired extent, after which the screws are tightened.

It will be evident that the nose-piece may be made tubular at the opposite ends, to admit solid projections on the frame.

I claim as my invention, and desire to secure by Letters Patent—

The nose-piece C, adapted to projections $b$, on the frames of the spectacles, for the adjustability of the same, substantially in the manner set forth.

In testimony whereof, I have signed my name to this specification in the presence of two subscribing witnesses.

EDWARD HUNTER.

Witnesses:
H. HOWSON,
C. B. PRICE.